(12) United States Patent
Branover et al.

(10) Patent No.: US 8,862,909 B2
(45) Date of Patent: Oct. 14, 2014

(54) SYSTEM AND METHOD FOR DETERMINING A POWER ESTIMATE FOR AN I/O CONTROLLER BASED ON MONITORED ACTIVITY LEVELS AND ADJUSTING POWER LIMIT OF PROCESSING UNITS BY COMPARING THE POWER ESTIMATE WITH AN ASSIGNED POWER LIMIT FOR THE I/O CONTROLLER

(75) Inventors: Alexander J. Branover, Chestnut Hill, MA (US); Madhu Saravana Sibi Govindan, Austin, TX (US); Guhan Krishnan, Chelmsford, MA (US); Hemant R. Mohapatra, Cambridge (GB); Andrew W. Lueck, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 291 days.

(21) Appl. No.: 13/310,231

(22) Filed: Dec. 2, 2011

(65) Prior Publication Data
US 2013/0145180 A1 Jun. 6, 2013

(51) Int. Cl.
*G06F 1/00* (2006.01)
*G06F 1/32* (2006.01)
*G06F 1/26* (2006.01)

(52) U.S. Cl.
CPC .. *G06F 1/32* (2013.01); *G06F 1/00* (2013.01); *G06F 1/26* (2013.01)
USPC .......................................................... 713/300

(58) Field of Classification Search
CPC ..................... G06F 1/00; G06F 1/26
See application file for complete search history.

(56) References Cited

U.S. PATENT DOCUMENTS 4,237,535 A    12/1980   Wiedenman
4,980,836 A    12/1990   Carter et al.
(Continued)

FOREIGN PATENT DOCUMENTS

EP    1363180    11/2003
GB    2395309    5/2004
(Continued)

OTHER PUBLICATIONS

International Search Report in related Application No. PCT/US2011/043978, Oct. 7, 2011, pp. 1-10.
(Continued)

*Primary Examiner* — Thomas Lee
*Assistant Examiner* — Zhipeng Wang
(74) *Attorney, Agent, or Firm* — Rory D. Rankin; Meyertons, Hood, Kivlin, Kowert & Goetzel, P.C.

(57) ABSTRACT

A system and method for efficient management of operating modes within an IC for optimal power and performance targets. On a same die, an SOC includes one or more processing units and a input/output (I/O) controller (IOC). The multiple interfaces within the IOC manage packets and messages according multiple different protocols. The IOC maintains an activity level for each one of the multiple interfaces. This activity level may be based at least on a respective number of transactions executed by a corresponding one of the multiple interfaces. The IOC determines a power estimate for itself based on at least the activity levels. In response to detecting a difference between the power estimate and an assigned I/O power limit for the IOC, a power manager adjusts at least respective power limits for the one or more processing units based on at least the difference.

20 Claims, 5 Drawing Sheets

(56) References Cited

U.S. PATENT DOCUMENTS

| | | | |
|---|---|---|---|
| 5,396,635 A | 3/1995 | Fung | |
| 5,490,059 A | 2/1996 | Mahalingaiah et al. | |
| 5,617,572 A | 4/1997 | Pearce et al. | |
| 5,692,202 A | 11/1997 | Kardach et al. | |
| 5,712,826 A | 1/1998 | Wong et al. | |
| 5,740,417 A | 4/1998 | Kennedy et al. | |
| 5,764,089 A | 6/1998 | Partovi et al. | |
| 5,774,704 A | 6/1998 | Williams | |
| 5,815,693 A | 9/1998 | Mcdermott et al. | |
| 5,917,355 A | 6/1999 | Klass | |
| 6,055,640 A | 4/2000 | Kageshima et al. | |
| 6,278,308 B1 | 8/2001 | Partovi et al. | |
| 6,334,167 B1 | 12/2001 | Gerchman et al. | |
| 6,473,732 B1 | 10/2002 | Chen | |
| 6,510,525 B1 | 1/2003 | Nookala | |
| 6,553,501 B1 | 4/2003 | Yokoe | |
| 6,597,620 B1 | 7/2003 | McMinn | |
| 6,611,435 B2 | 8/2003 | Kumar | |
| 6,636,977 B1 | 10/2003 | Chen | |
| 6,657,634 B1 | 12/2003 | Sinclair et al. | |
| 6,820,209 B1 | 11/2004 | Culbert et al. | |
| 6,836,849 B2 | 12/2004 | Brock et al. | |
| 6,859,886 B1 * | 2/2005 | Johnson | 713/600 |
| 6,954,864 B2 | 10/2005 | Schelling | |
| 6,988,214 B1 | 1/2006 | Verdun | |
| 7,085,941 B2 | 8/2006 | Li | |
| 7,089,437 B2 | 8/2006 | Swoboda | |
| 7,111,179 B1 | 9/2006 | Girson et al. | |
| 7,152,169 B2 | 12/2006 | Cooper et al. | |
| 7,159,766 B2 | 1/2007 | Wurzburg et al. | |
| 7,200,762 B2 | 4/2007 | Pearl | |
| 7,254,721 B1 | 8/2007 | Tobias et al. | |
| 7,301,373 B1 | 11/2007 | Bailey et al. | |
| 7,409,568 B2 | 8/2008 | Tam | |
| 7,420,378 B2 | 9/2008 | Audet et al. | |
| 7,428,644 B2 | 9/2008 | Jeddeloh et al. | |
| 7,437,581 B2 | 10/2008 | Grochowski et al. | |
| 7,454,637 B2 | 11/2008 | Er | |
| 7,464,276 B2 | 12/2008 | Rusu et al. | |
| 7,496,777 B2 | 2/2009 | Kapil | |
| 7,498,694 B2 | 3/2009 | Luo et al. | |
| 7,502,948 B2 | 3/2009 | Rotem et al. | |
| 7,565,562 B2 | 7/2009 | Chary | |
| 7,596,709 B2 | 9/2009 | Cooper et al. | |
| 7,613,934 B2 | 11/2009 | Hou et al. | |
| 7,617,406 B2 | 11/2009 | Yasuo | |
| 7,664,971 B2 | 2/2010 | Oh | |
| 7,702,938 B2 | 4/2010 | Ha | |
| 7,743,267 B2 | 6/2010 | Snyder et al. | |
| 7,800,621 B2 | 9/2010 | Fry | |
| 7,802,060 B2 | 9/2010 | Hildebrand | |
| 7,818,596 B2 | 10/2010 | Fenger et al. | |
| 7,840,827 B2 | 11/2010 | Dahan et al. | |
| 7,868,479 B2 | 1/2011 | Subramaniam | |
| 7,873,850 B2 | 1/2011 | Cepulis et al. | |
| 7,899,990 B2 | 3/2011 | Moll et al. | |
| 7,917,787 B2 | 3/2011 | Jahagirdar et al. | |
| 7,966,506 B2 | 6/2011 | Bodas et al. | |
| 7,966,511 B2 | 6/2011 | Naveh et al. | |
| 7,979,699 B2 | 7/2011 | Buch et al. | |
| 8,010,822 B2 | 8/2011 | Marshall et al. | |
| 8,064,197 B2 | 11/2011 | Mowry et al. | |
| 8,069,359 B2 | 11/2011 | Tolentino | |
| 8,108,703 B2 | 1/2012 | Bahali et al. | |
| 8,145,927 B2 | 3/2012 | Okitsu et al. | |
| 8,181,046 B2 | 5/2012 | Marcu et al. | |
| 2001/0011356 A1 | 8/2001 | Lee et al. | |
| 2002/0087896 A1 | 7/2002 | Cline et al. | |
| 2003/0110012 A1 | 6/2003 | Orenstien et al. | |
| 2003/0120961 A1 | 6/2003 | Cooper | |
| 2003/0149904 A1 | 8/2003 | Kim | |
| 2005/0050373 A1 | 3/2005 | Orenstien et al. | |
| 2005/0080967 A1 | 4/2005 | Ries et al. | |
| 2006/0004538 A1 | 1/2006 | Cancel | |
| 2006/0090161 A1 | 4/2006 | Bodas et al. | |
| 2006/0112286 A1 | 5/2006 | Whalley et al. | |
| 2006/0149975 A1 | 7/2006 | Rotem et al. | |
| 2006/0154692 A1 * | 7/2006 | Ikehara et al. | 455/556.2 |
| 2006/0174142 A1 | 8/2006 | Lin et al. | |
| 2006/0187226 A1 | 8/2006 | Bruno et al. | |
| 2006/0236140 A1 | 10/2006 | Tanaka | |
| 2006/0248356 A1 | 11/2006 | Won et al. | |
| 2006/0253715 A1 | 11/2006 | Ghiasi et al. | |
| 2006/0259793 A1 | 11/2006 | Moore et al. | |
| 2006/0282692 A1 | 12/2006 | Oh | |
| 2006/0288243 A1 | 12/2006 | Kim | |
| 2007/0061603 A1 | 3/2007 | Cox et al. | |
| 2007/0115290 A1 | 5/2007 | Polzin et al. | |
| 2007/0124609 A1 | 5/2007 | Lee | |
| 2007/0156370 A1 | 7/2007 | White et al. | |
| 2007/0174650 A1 | 7/2007 | Won et al. | |
| 2007/0245161 A1 * | 10/2007 | Shaw et al. | 713/300 |
| 2008/0005591 A1 | 1/2008 | Trautman et al. | |
| 2008/0005592 A1 | 1/2008 | Allarey et al. | |
| 2008/0022140 A1 | 1/2008 | Yamada et al. | |
| 2008/0082841 A1 * | 4/2008 | Juenemann et al. | 713/300 |
| 2008/0082844 A1 | 4/2008 | Ghiasi et al. | |
| 2008/0098242 A1 | 4/2008 | Peterson | |
| 2008/0162770 A1 | 7/2008 | Titiano et al. | |
| 2008/0172565 A1 | 7/2008 | Chu et al. | |
| 2008/0172567 A1 * | 7/2008 | Zhang et al. | 713/323 |
| 2008/0288796 A1 | 11/2008 | Nakamura et al. | |
| 2009/0049315 A1 | 2/2009 | Diab et al. | |
| 2009/0150696 A1 | 6/2009 | Song et al. | |
| 2009/0153109 A1 | 6/2009 | Koertzen et al. | |
| 2009/0164814 A1 | 6/2009 | Axford et al. | |
| 2009/0199020 A1 | 8/2009 | Bose et al. | |
| 2009/0222678 A1 * | 9/2009 | Yu et al. | 713/300 |
| 2009/0230769 A1 | 9/2009 | Aerts | |
| 2009/0235108 A1 | 9/2009 | Gold et al. | |
| 2009/0254909 A1 | 10/2009 | Hanson et al. | |
| 2009/0259345 A1 | 10/2009 | Kato et al. | |
| 2009/0271646 A1 | 10/2009 | Talwar et al. | |
| 2010/0013543 A1 | 1/2010 | Kang | |
| 2010/0023790 A1 | 1/2010 | Cooper et al. | |
| 2010/0115304 A1 | 5/2010 | Finkelstein et al. | |
| 2010/0153763 A1 | 6/2010 | Sood | |
| 2010/0162023 A1 | 6/2010 | Rotem et al. | |
| 2010/0268975 A1 * | 10/2010 | Bose et al. | 713/340 |
| 2010/0296238 A1 | 11/2010 | Mowry et al. | |
| 2010/0332856 A1 | 12/2010 | Song | |
| 2011/0022857 A1 * | 1/2011 | Nussbaum et al. | 713/300 |
| 2011/0022860 A1 * | 1/2011 | Schindler | 713/300 |
| 2011/0055609 A1 | 3/2011 | Karayi et al. | |
| 2011/0113273 A1 | 5/2011 | Okitsu et al. | |
| 2011/0178652 A1 | 7/2011 | Carter et al. | |
| 2012/0066535 A1 | 3/2012 | Naffziger | |
| 2012/0210150 A1 * | 8/2012 | de Lind van Wijngaarden et al. | 713/320 |

FOREIGN PATENT DOCUMENTS

| | | |
|---|---|---|
| GB | 2406184 | 3/2005 |
| WO | 03027819 | 4/2003 |
| WO | 2007103051 | 9/2007 |

OTHER PUBLICATIONS

Fischer et al.; "A 90nm Variable-Frequency Clock System for a Power-Managed Itanium-Family Processor;" 2005 IEEE International Solid State Circuits Conference (ISSCC), Feb. 8, 2005; pp. 1-3.

Karnik et al.; "Scaling trends of Cosmic Rays induced Soft Errors in static latches beyond 0.18u;" 2001 Symposium on VLSI Circuits Digest of Technical Papers, Jan. 2001; pp. 61-62.

Goel et al.; "Low-Overhead Design of Soft-Error-Tolerant Scan Flip-Flops with Enhanced-Scan Capability;" Proceedings of the 2006 Conference on Asia South Pacific Design Automation: ASP-DAC 2006, Yokohama, Japan, Jan. 24-27, 2006; pp. 665-670.

Krishnamohan, Srivatsan; Mahapatra, Nihar R.; "A Highly-Efficient Technique for Reducing Soft Errors in Static CMOS Circuits;" Proceedings of the IEEE International Conference on Computer Design (ICCD '04), Oct. 11-13, 2004; pp. 1-6.

(56) References Cited

OTHER PUBLICATIONS

Tanenbaum, Andrew S.; "Structured Computer Organization (Third Edition);" Section 1.4 Hardware, Software, and Multilevel Machines, Prentice Hall, New Jersey, 1990, ISBN: 0-13-854662-2; cover pp. 1-2 and pp. 11-13.

"Advanced Configuration and Power Interface Specification"; Hewlett-Packard Corporation, Intel Corporation, Microsoft Corporation, Phoenix Technologies Ltd., Toshiba Corporation, Oct. 10, 2006; pp. 1-631.

Ware, et al.;"Architecting for Power Management: The IBM POWER7 Approach", 2010 IEEE 16th International Symposium on High Performance Computer Architecture (HPCA); Jan. 9, 2010; Piscataway, NJ, USA pp. 1-11.

Whitepaper: "Advanced Configuration and Power Interface Specification", Hewlett-Packard Inc; Jun. 16, 2009 pp. 19-23.

Isci, et al "Live, Runtime Phase Monitoring and Prediction on Real Systems with Application to Dynamic Power Management" 2006, pp. 1-12, Micro 39 Proceedings of the 39th Annual IEEE/ACM International Symposium on Microarchitecture.

Govil, et al.; "Comparing Algorithms for Dynamic Speed-Setting of a Low-Power CPU", Proceedings of the Annual International Conference on Mobile Computing and Networking; Mobicom; Nov. 13, 1995; pp. 13-25.

International Search Report and Written Opinion in application No. PCT/US2012/066728 mailed Sep. 3, 2013 pp. 1-10.

\* cited by examiner

SYSTEM AND METHOD FOR DETERMINING A POWER ESTIMATE FOR AN I/O CONTROLLER BASED ON MONITORED ACTIVITY LEVELS AND ADJUSTING POWER LIMIT OF PROCESSING UNITS BY COMPARING THE POWER ESTIMATE WITH AN ASSIGNED POWER LIMIT FOR THE I/O CONTROLLER

BACKGROUND

1. Field of the Invention

This invention relates to computing systems, and more particularly, to efficient management of operating modes within a system-on-a-chip (SOC) for optimal power and performance targets.

2. Description of the Relevant Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for high-performance microprocessors, which may include multiple processor cores, or cores, and multiple pipelines within a core.

A system-on-a-chip (SOC) integrates multiple functions into a single integrated chip substrate. The functions may include digital, analog, mixed-signal and radio-frequency (RF) functions. Typical applications are used in the area of embedded systems. Energy-constrained cellular phones, portable communication devices and entertainment audio/video (A/V) devices are some examples of systems using an SOC. An SOC may use powerful processors, whereby power consumption may significantly rise if not managed.

A power management unit (PMU) for an IC like an SOC may disable portions of the SOC when it detects or is otherwise informed that the portion is unused for a given period of time. Similarly, power-performance states (P-states) may be adjusted based on compute unit usage feedback. These portions usually refer to general-purpose processors, graphics processors, and other processing units (although more gross or finer granularities are possible). Typically, a complex and multi-platform interface controller hub is located off-chip.

When such a platform input/output (I/O) controller hub (PICH) is placed on-die within the SOC, the power management mechanism does not monitor an activity level or a power estimate for the PICH. Rather, the power management mechanism may assume either a constant high power condition or a constant low power condition in the PICH. When a constant high power condition is used, a non-trivial performance loss may occur in the on-die processors. When a constant low power condition is used, thermal throttling may occur due to temperature overages.

In view of the above, efficient methods and systems for efficient management of operating modes within a IC for optimal power and performance targets are desired.

SUMMARY OF EMBODIMENTS

Systems and methods for efficient management of operating modes within an IC for optimal power and performance targets are contemplated.

In various embodiments, a semiconductor chip includes one or more processing units each of which is assigned a respective power limit representing a portion of a chip power limit for the semiconductor chip. The semiconductor chip may be a system-on-a-chip (SOC) that includes multiple processing units to integrate varied functionality on a single die. The semiconductor chip also includes a platform input/output (I/O) controller hub (PICH) that includes multiple interfaces and shares on-die real estate with the one or more processing units. The interfaces may manage packets and messages between the semiconductor chip and other components or devices.

Examples of the protocols used to manage I/O operations for the one or more processing units include Universal Serial Bus (USB), Peripheral Component Interconnect Express (PCIe), Serial Advanced Technology Attachment (SATA), multi-channel high definition audio codec, and system basic input/output software (BIOS) stored in a read only memory (ROM). In various embodiments, the PICH maintains an activity level for each one of the multiple interfaces. In one embodiment, this activity level is based at least in part on a respective number of transactions executed by a corresponding one of the multiple interfaces. A power reporting unit within the PICH determines a power estimate for the PICH based on at least the activity levels and sends the power estimate to a power manager. In response to detecting a difference between the power estimate and an assigned I/O power limit for the PICH, the power manager may adjust power limits for the one or more processing units.

These and other embodiments will be further appreciated upon reference to the following description and drawings.

Figure 1:
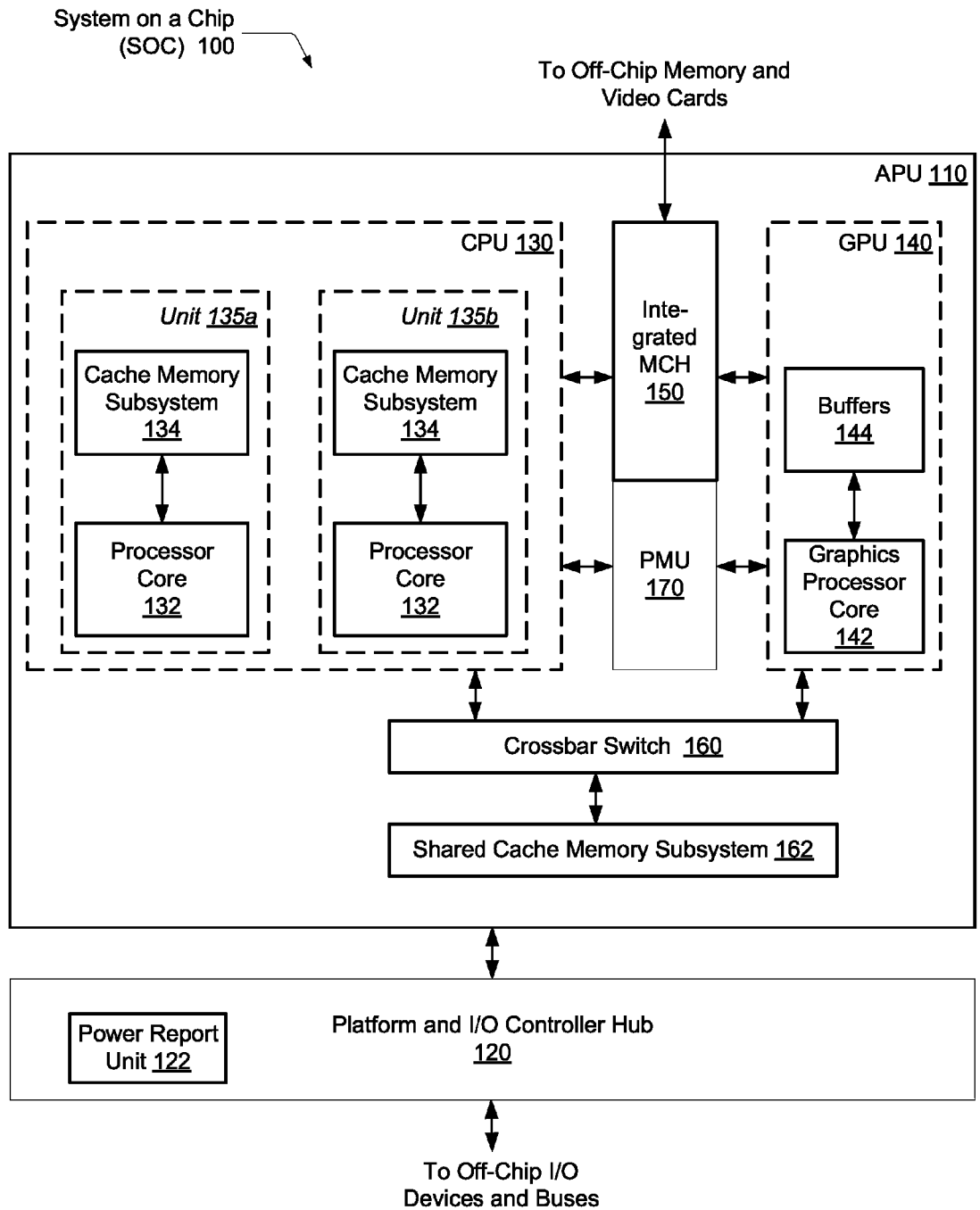
FIG. 1 is a generalized block diagram of one embodiment of a system-on-a-chip (SOC).

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Turning to FIG. 1, a generalized block diagram of one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes both an accelerated processing unit (APU) 110 and a platform and input/output (I/O) controller hub 120 on a single semiconductor die.

In one embodiment, the APU 110 may include a general-purpose central processing unit (CPU) 130 and a graphics processing unit (GPU) 140 on a same semiconductor die. Such a design may provide more efficient data transfer and communication between the CPU 130 and the GPU 140 yielding higher performance. Further details of each are provided shortly. The APU 110 may utilize an integrated memory controller hub (IMCH) 150 to directly communicate with off-chip memory and video cards. The off-chip memory may include at least dynamic random access memory (DRAM). The DRAM may be located on dual in-line memory modules (DIMMs) on a motherboard or a separate card on the motherboard. In addition, the IMCH 150 may be connected to off-chip disk memory through an external memory bus.

In one embodiment, the IMCH 150 may include integrated channel circuitry to directly link signals from the platform and input/output (I/O) controller hub 120 to the CPU 130 and the GPU 140 for data control and access. The platform and I/O controller hub (PICH) 120 may interface with different I/O buses according to given protocols. The PICH 120 may perform I/O functions and communicate with devices and software such as peripherals following the Universal Serial Bus (USB) protocol, peripherals and network cards following the Peripheral Component Interconnect Express (PCIe) protocol, the system basic input/output software (BIOS) stored in a read only memory (ROM), interrupt controllers, Serial Advanced Technology Attachment (SATA) devices, network interfaces, a multi-channel high definition audio codec functionality and interface and so forth. The PICH 120 may respond to control packets and messages received on respective links and generate control packets and response packets in response to information and commands received from the APU 110. The PICH 120 may perform on-die the operations typically performed off-die by a conventional southbridge chipset.

In one embodiment, the IMCH 150 may include a power management unit (PMU) 170. In another embodiment, the PMU 170 is a separate functional block from the IMCH 150. The PMU 170 may receive measured power consumption values from each of the CPU 130, the GPU 140 and the PICH 120. The PMU 170 may sum the measured values and compare the result to a threshold, such as a thermal design power (TDP). The TDP is the amount of power that a cooling system for the SOC 100 can dissipate. The PMU 170 may communicate with each of the CPU 130, the GPU 140 and the PICH 120 to adjust their respective operating modes based on the comparison with the TDP. For example, one or more cores or functional blocks within each of the CPU 130 and the GPU 140 may be disabled. Additionally, a power-performance state (p-state) may be adjusted in either the CPU 130 or the GPU 140. Further still, an amount of received messages within the PICH 120 may be delayed, reduced or sped up. An amount and/or a rate of received data may also be adjusted within the PICH 120 based on the comparison.

In order for the PMU 170 to make adjustments to the operating modes of each of the CPU 130, the GPU 140 and the PICH 120, in one embodiment, the PMU 170 receives a report from the PICH 170. The power report unit 122 within the PICH 120 may determine a current power consumption for the PICH 120 and send the corresponding value to the power management unit (PMU) 170 within the APU 110. The received report may include a computed activity level for the PICH 120. In one embodiment, the activity level is based on maintaining an average count of I/O and direct memory access (DMA) transactions over a configurable time-interval. The I/O and DMA transactions may include packets, messages, requests and so forth. In one embodiment, the activity level may be correlated with power consumption values.

Both a measured transaction count and a maximum transaction count may be maintained over a configurable time-interval for each one of a group of interfaces. Each group of interfaces may include one or more interfaces related to one another or have a similar effect on power consumption. A maximum transaction count for each group of interfaces may be determined based on a respective maximum supported data rate. In addition, each one of the groups of interfaces may have an associated normalized weight corresponding to an internal power consumed when transactions are performed.

In one embodiment, an estimated power consumption for the PICH 120 may be calculated at the end of each given time interval as: $\Sigma[((AvgCt(i)/MaxCt(i)) \times Weight(i)) \times DynPwr + StatPwr]$, wherein the index i is used for each one of the groups of interfaces. Here, the term "AvgCt(i)" is a running count of transactions performed on a respective one of the groups of interfaces during the time interval. Alternatively, the term "AvgCt(i)" is an average count of transactions performed during the time interval. The terms "MaxCt(i)" and "Weight(i)" are the maximum count possible and a normalized weight for a given one of the groups of interfaces. The term "DynPwr" may correlate the product $((AvgCt(i)/MaxCt(i)) \times Weight(i))$ with a power consumption value to be sent to and recognized by the PMU 170. The term "StatPwr" may be a static power consumed by a given one of the interface groups even when no transactions are received. StatPwr may assume a certain ambient temperature.

In another embodiment, an internal power of a given one of the interface groups may be determined by electrical current and/or voltage measurements, rather than a transaction count. A given configuration of the I/O interfaces, such as USB and SATA controllers, may affect the power measurements. The calculated power consumption for the PICH 120 may be sent to the PMU 170 where power management algorithms are executed. The PMU 170 may increase power budgets, such as a TDP budget, for one or more of the CPU 130 and the GPU 140 when a calculated power consumption value from the PICH 120 is relatively low. Similarly, the PMU 170 may decrease power budgets for one or more of the CPU 130 and the GPU 140 when a calculated power consumption value from the PICH 120 is relatively high. Further details are provided later. However, first a further description of the components of the SOC 100 is given below.

The SOC 100 may include one or more clock sources, such as phase lock loops (PLLs), which are not shown for ease of illustration. The clock sources may provide clock signals for each of the components within the SOC 100. The CPU 130 may include one or more processing units 135a-135b, which may include a processor core 132 and a corresponding cache memory subsystem 134. In some embodiments, the CPU 130 may also include a shared cache memory subsystem (not shown) that is accessed by each one of the processing units 135a-135b.

Each processor core 132 may include circuitry for executing instructions according to a given instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, the processor core 132 accesses the cache memory subsystems 134, respectively, for data and instructions. If the requested block is not found in cache memory subsystem 134 or in any shared cache memory subsystem within the CPU 130, then a read request may be generated and transmitted to the integrated MCH 150. The integrated MCH 150 may perform address translations and queue the request before sending it to off-chip memory through a respective memory bus.

Continuing with the components of the SOC 100, cache subsystems 134 may comprise high-speed cache memories configured to store blocks of data. Cache memory subsystems 114 may be integrated within a respective processor core 112. Alternatively, cache memory subsystems 114 may be connected to a processor core 112 in a backside cache configuration or an inline configuration, as desired. Still further, cache memory subsystems 114 may be implemented as a hierarchy of caches. Caches that are located nearer processor cores 112 (within the hierarchy) may be integrated into a processor core 112, if desired.

In one embodiment, cache memory subsystems 134 each represent L2 cache structures, and shared cache subsystem 162 represents an L3 cache structure. Both the cache memory subsystem 134 and the shared cache memory subsystem 162 may include a cache memory coupled to a corresponding cache controller. In one embodiment, each processor core 132 and each graphics processor core 142 may share storage space and data within the shared cache memory subsystem 162 through the crossbar switch 160. A cache coherence protocol may be maintained by the crossbar switch 162 and each of the cache controllers. The GPU 140 may be able to both directly access both local memories 134 and 162 and off-chip memory via the integrated MCH 150. This embodiment may lower latency for memory accesses for the GPU 140, which may translate into higher performance.

The integrated MCH 150 may follow memory channel protocols for off-chip memory, such as DRAM stored in DIMMS. The protocol may determine values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM.

In one embodiment, the GPU 140 may include one or more graphic processor cores 142 and data storage buffers 144. A GPU may be a dedicated graphics-rendering device for a personal computer, a workstation, or a video game console. The graphic processor core may perform data-centric operations for at least graphics rendering and three dimensional (3D) graphics applications. The graphics processor core 142 may have a highly parallel structure making it more effective than the general-purpose CPU 130 for a range of complex algorithms. The graphics processor core 142 may include multiple parallel data paths. Each of the multiple data paths may include multiple pipeline stages, wherein each stage has multiple arithmetic logic unit (ALU) components and operates on a single instruction for multiple data values in a data stream.

The graphics processor core 142 may generally execute the same programs, such as vertex shaders or pixel shaders, on large numbers of objects (vertices or pixels). Since each object is processed independently of other objects, but the same sequence of operations is used, a single-instruction-multiple-data (SIMD) parallel datapath may provide a considerable performance enhancement. The graphics processor core 142 may provide or be connected to a video decoding unit to allow video decoding to be hardware accelerated.

In one embodiment, the CPU 130 and the GPU 140 may be proprietary cores from different design centers. Other various processors may be placed in the SOC 100 in addition to or in place of the CPU 130 and the GPU 140. Other examples of on-die processors the SOC 100 may use include at least digital signal processing (DSP) cores, field programmable gate arrays (FPGAs), application specific integrated circuits (ASICs), and so forth.

Figure 2:
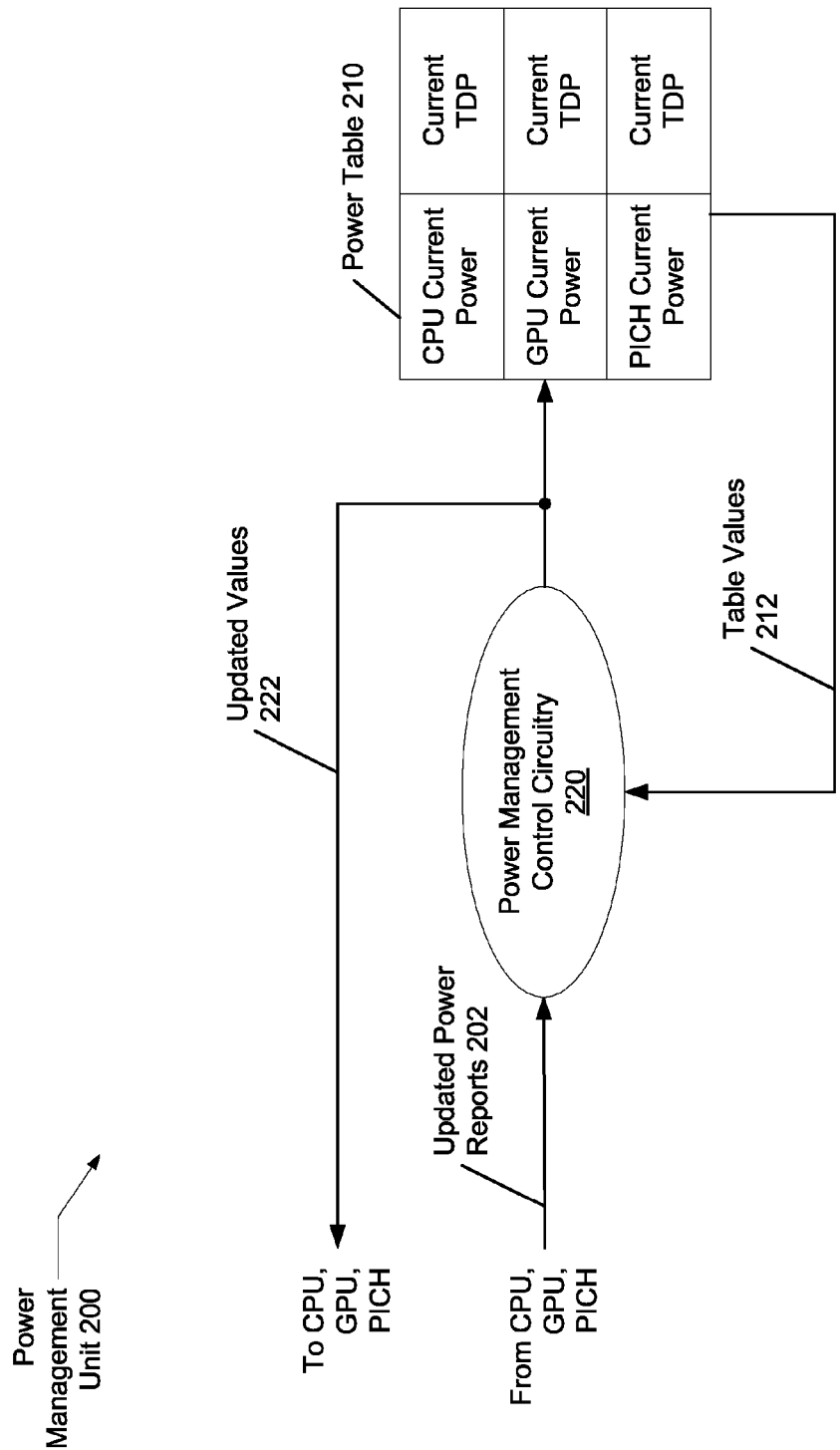
FIG. 2 is a generalized block diagram of one embodiment of a power management unit for a SOC.

Turning now to FIG. 2, a generalized block diagram of one embodiment a power management unit 200 is shown. The power management unit 200 may directly communicate with one or more components in each of the APU 110 and the PICH 120. For example, the CPU 130 and the GPU 140 may communicate with the power management unit 200. In one embodiment, the power management unit (PMU) 200 includes a power table 210. The power table 210 may include a separate entry for the PICH 120 and each of the units within the APU 110, such as the CPU 130 and the GPU 140. In some embodiments wherein the APU 110 includes other types of units, such as a FPGA, an ASIC, or other, these units may be listed in the power table 210. The PICH 120 may communicate with the power management unit 200. In some embodiments, one or more groups of interfaces within the PICH 120 may directly communicate with the power management unit 200 and have corresponding entries in the power table 210.

In one embodiment, each entry within the power table 210 may include several fields. An identifier (ID) field may identify which of the units or groups on the die of the SOC 100 corresponds to a particular entry. In other embodiments, a given entry position within the power table 210 may be assigned to a given unit and an ID is not used.

Each entry of the power table 210 may store a current power consumed value for a corresponding unit. This value may be included in the updated power reports 202 from each of the CPU 130, the GPU 140 and the PICH 120. In addition, each entry of the power table 210 may store a current TDP value assigned to a corresponding unit. The power table 210 may include a thermal design power (TDP) value for the PICH 120 and each of the CPU 130 and the GPU 140 within the APU 110. This TDP value may be set to an initial TDP value, which is later updated based on the current power consumed values.

Generally speaking, the TDP is an amount of power that a cooling system for the SOC 100 can dissipate. To prevent failure, the SOC 100 typically operates within the TDP value. The TDP value may be divided and each portion of the total TDP value may be allocated or assigned to each of the components listed in the power table 210, such as the CPU 130, the GPU 140 and the PICH 120. For example, the SOC 100 may have a TDP value of 120 watts. The CPU 130 may have an initial TDP value of 45 watts, the GPU 140 may have an initial TDP value of 30 watts and the PICH 120 may have an initial TDP value of 25 watts. The power table 210 may initially store these allocated TDP values.

In one embodiment, the power management control circuitry 220 receives updated power reports 202 from each of the CPU 130, the GPU 140 and the PICH 120. The updated power reports 202 may be reported to the power management unit 200 every given time interval. The control circuitry 220 may receive both the updated power reports 202 and table values 212 from the power table 210. With these inputs, the control circuitry 220 may determine updated values 222 to use to update the power table 210 and to send to the respective units. In other embodiments, the respective units may receive updated values from the power table 210, rather than from outputs of the control circuitry 220.

When new activity levels, power values, or both are reported by the respective units within the updated power reports 202 to the control circuitry 220, one or more entries within the power table 210 may be updated. For example, a given field in a given entry may store a current TDP value for the CPU 130. This stored current TDP value may differ from a corresponding initial TDP value for the CPU 130.

In one example, the stored TDP value for the CPU 130 may be 40 watts, rather than an initial 45 watts. In addition, this stored value may change again based on the information within the updated power reports 202. The control circuitry 220 may determine the GPU 140 and the PICH 120 are consuming an amount of power significantly less than their current TDP values. Therefore, the CPU 130 may operate at a higher clock frequency for higher performance and consume more power. Therefore, in this example, the TDP value for the GPU 140 and the PICH 120 may decrease while the TDP value for the CPU 130 may increase from 40 watts to 50 watts.

The updated power reports 202 may allow monitored changes within each of the units, such as the CPU 130, the GPU 140 and the PICH 120, to be used for power management and operating mode adjustments. Here, none of the units, such as the PICH 120, uses a constant value that doesn't change over time. For example, the updated power reports 202 do not use a maximum or a minimum constant power consumption value for the PICH 120. Rather, a measured activity level or power consumption value based on an actual utility of the components within the PICH 120 is used.

In one embodiment, the updated power reports 202 includes values measured in watts or converted to watts. In other embodiments, the updated power reports 202 includes values in normalized units. In yet other embodiments, the updated power reports 202 include measured current drawn values and operational voltages that the control circuitry 220 uses to determine power usage differences between the respective units. On-die current sensors may provide the estimates of drawn currents to the control circuitry 220 within the PMU 200.

When the control circuitry 220 detects any updated power estimate in the reports 202 exceeds a corresponding limit, the control circuitry 220 may adjust an allocation of the SOC TDP value. The reallocation of permitted power consumption may reduce an activity level and current consumption of a violating on-die unit. For example, the CPU 130 may have its respective allocated TDP value increased as the allocated TDP values for each of the GPU 140 and the PICH 120 decrease. At a later time, an even larger workload may be run on the CPU 130 causing its activity level and power consumption to increase. Alternatively, an activity level for one or more of the GPU 140 and the PICH 120 may increase. In either case, the overall power consumption for the SOC 100 may now approach or exceed initial TDP for the SOC 100. When the control circuitry 220 detects the exceeding condition, the allocated TDP values for each of the units may be adjusted in a manner to reduce the overall TDP. Afterward, the units receive the updated values from the control circuitry 220 or from the power table 210. The units may make internal adjustments based on the received updated values.

Figure 3:
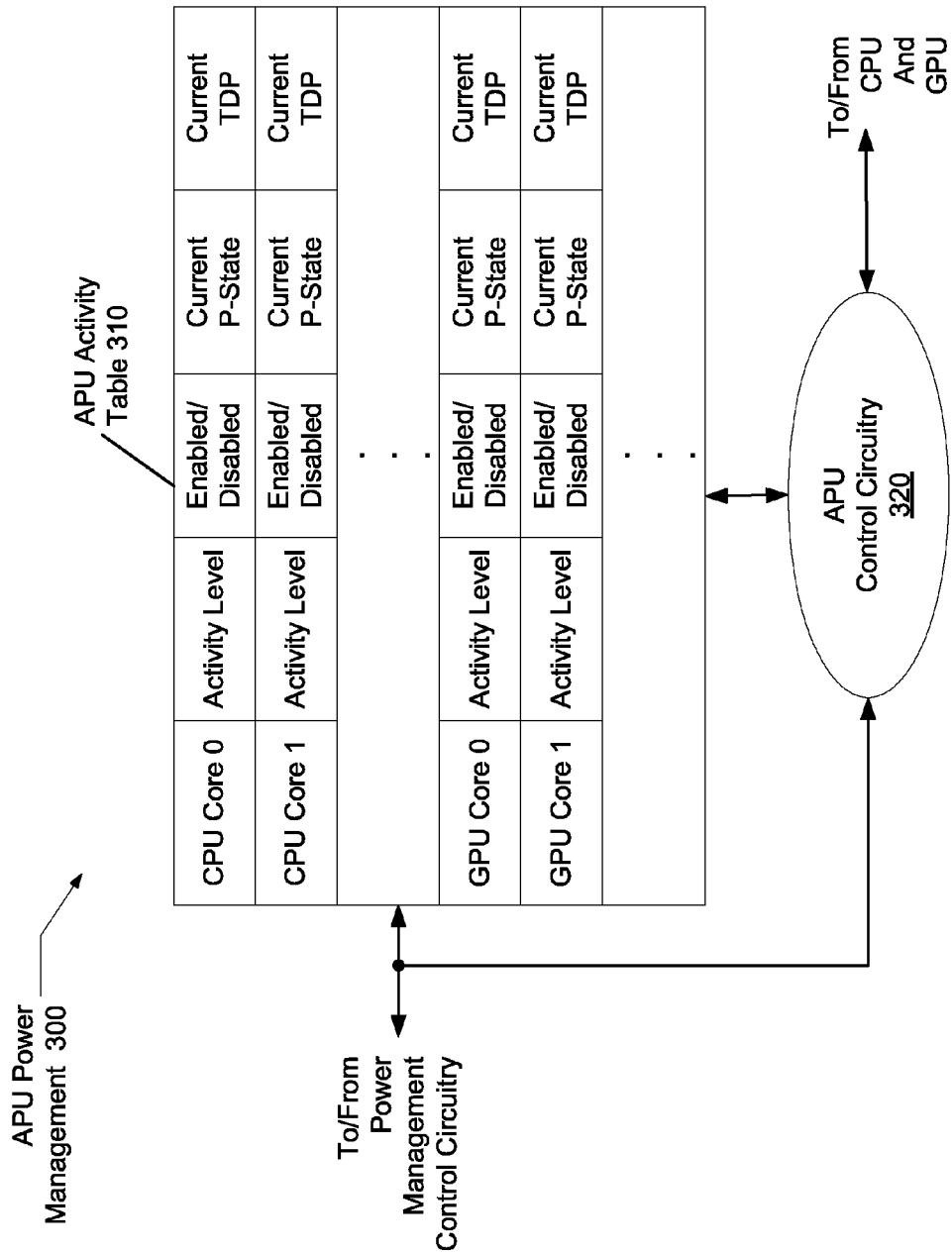
FIG. 3 is a generalized block diagram of one embodiment of a power management unit for an accelerated processing unit (APU).

Referring now to FIG. 3, a generalized block diagram of one embodiment of the accelerated processing unit (APU) power management 300 is shown. In one embodiment, the APU power management 300 includes an APU activity table 310. The APU activity table 310 may include a separate entry for each of the cores within the APU 110, such as the one or more processor cores within the CPU 130 and the one or more graphics processor cores within the GPU 140. In some embodiments wherein the APU 110 includes other types of units, such as a FPGA, an ASIC, or other, these units may be listed in the APU activity table 310. In other embodiments, a separate table and control circuitry is utilized in each of the CPU 130 and the GPU 140, rather than being combined as shown.

Each entry within the APU activity table 310 may include several fields. Similar to the power table 210, each entry within the APU activity table 310 may include an identifier (ID) field. The ID field may identify which of the cores within the CPU 130 and the GPU 140 corresponds to a particular entry. In other embodiments, a given entry position within the APU activity table 310 may be assigned to a given unit and an ID is not used.

Each entry of the APU activity table 310 may include an activity level for a corresponding core. Current sensors, a summation of weighted sampled signals, a count of issued instructions, temperature sensors, and so forth, may provide the activity level. Each entry of the APU activity table 310 may include an enabled/disabled state corresponding to a given core.

Additionally, each entry of the APU activity table 310 may store a current power-performance state (P-state) for a corresponding core. A given core may support a given number of discrete P-states. For N supported P-states, wherein N is an integer, a P-state $P_N$ may correspond to a discrete state with a lowest performance of all the supported discrete states and comprises the lowest operational frequency. In addition, the P-state $P_N$ may correspond to a discrete state with a lowest power consumption of all the supported discrete states and comprises the lowest operational voltage.

On the other hand, the P-state $P_0$ may correspond to a discrete state with a highest performance of all the supported discrete states and includes the highest operational frequency. In addition, the P-state $P_0$ may correspond to a discrete state with a highest power consumption of all the supported discrete states and includes the highest operational voltage. Typically, the endpoint discrete states represented by P-states $P_0$ and $P_N$ define a region of predictable performance. Supporting one or more P-states within this region may provide stable, optimal utilization of power and delivery of performance for the core.

Each entry of the APU activity table 310 may include a current TDP value for a corresponding core. In some embodiments, a TDP value allocated for a corresponding one of the CPU 130 or the GPU 140 may be divided and allocated across cores within the unit. In other embodiments, a TDP value is not maintained at a core level. Rather, the other values in the entries of the APU activity table 310 are used to control and manage power consumption at the core level without a core-level TDP value.

In one embodiment, the APU activity table 310 may send given values, such as an activity level, a P-state, a power consumption or TDP value, and so forth to the PMU. The PMU may use this information in the updated power reports 202 described earlier. Following, the PMU may send results of power management calculations to the APU power management. The APU activity table may receive values from the PMU control circuitry and update fields and entries accordingly. For example, the PMU may determine to reduce a TDP value for the GPU 140. Therefore, one or more GPU cores may be disabled due to low activity or have a P-state adjusted to a lower power and performance state. The APU control circuitry 320 may determine what adjustments to make based on each of the stored values in the APU activity table 310, calculated values from the PMU and monitored values within each of the cores.

Figure 4:
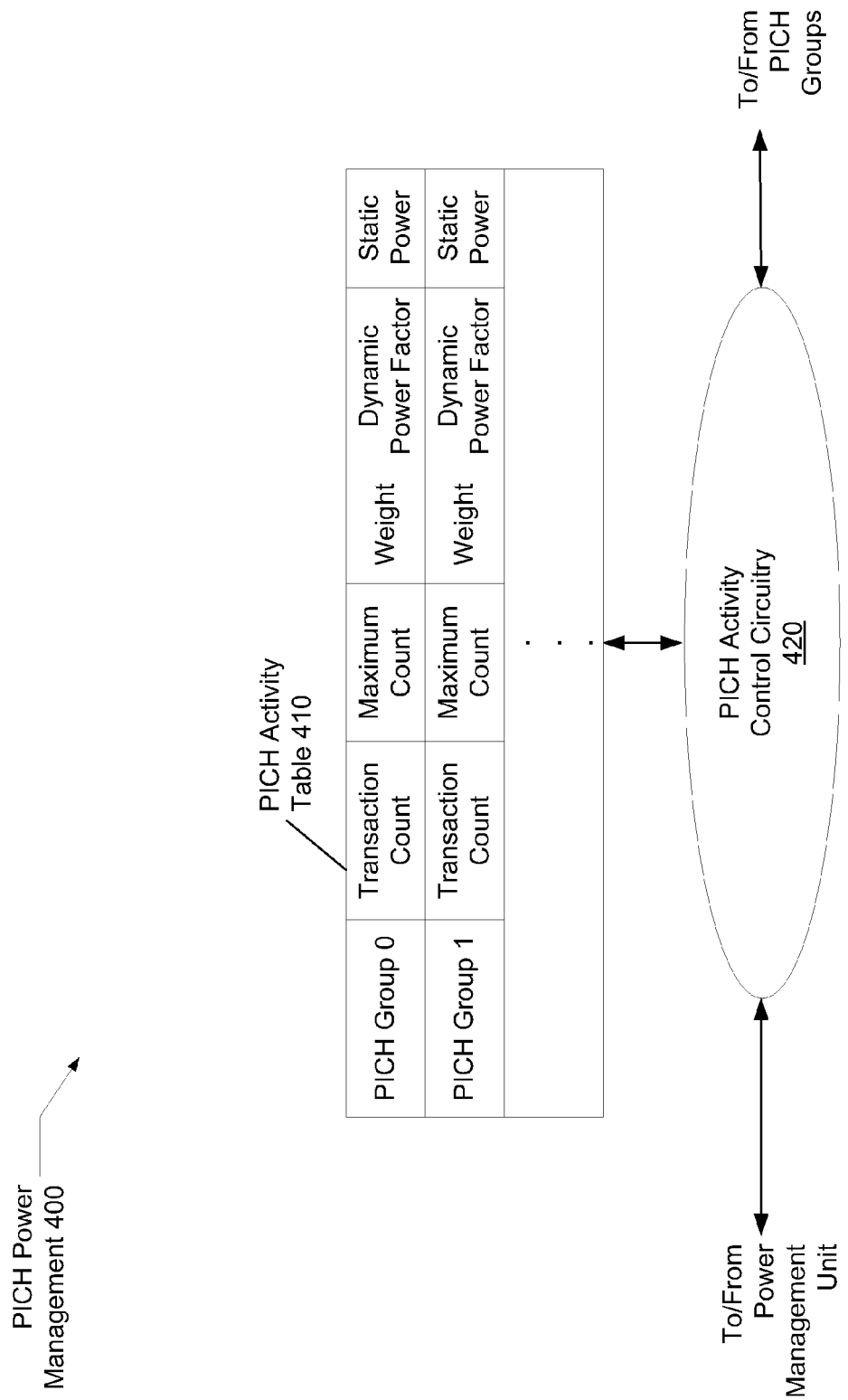
FIG. 4 is a generalized block diagram of one embodiment of a power management unit for a platform and I/O controller hub.

Turning now to FIG. 4, a generalized block diagram of one embodiment of the platform and I/O controller hub (PICH) power management 400 is shown. In one embodiment, the PICH power management 400 includes a PICH activity table 410. The PICH activity table 410 may include a separate entry for each one of a group of interfaces supported by the PICH 120. As described earlier, the PICH 120 may include one or more supported interfaces for different I/O buses according to given protocols. The PICH 120 may perform I/O functions and communicate with devices and software such as peripherals following the Universal Serial Bus (USB) protocol, peripherals and network cards following the Peripheral Component Interconnect Express (PCIe) protocol, the system basic input/output software (BIOS) stored in a read only memory (ROM), interrupt controllers, Serial Advanced Technology Attachment (SATA) devices, network interfaces, a multi-channel high definition audio codec functionality and interface and so forth.

Each entry within the PICH activity table 410 may include several fields. Similar to the power table 210 and the APU activity table 310, each entry within the PICH activity table 410 may include an identifier (ID) field. The ID field may identify which of the interfaces or group of interfaces within the PICH 120 corresponds to a particular entry. In other embodiments, a given entry position within the PICH activity table 410 may be assigned to a given unit and an ID is not used.

Each entry of the PICH activity table 410 may include a transaction count for a corresponding interface or interface group. The transaction count may be an average count of I/O and direct memory access (DMA) transactions over a configurable time-interval. The I/O and DMA transactions may include packets, messages, requests and so forth. A stored maximum transaction count for each group of interfaces may be determined based on a respective maximum supported data rate. Each entry of the PICH activity table 410 may include an associated normalized weight associated with an internal power consumed when transactions are performed on a corresponding group of interfaces.

In addition, each entry of the PICH activity table 410 may include a dynamic power factor for correlating calculated values to a power consumption value in watts. An additional static power factor may be stored in the table entries that indicates a static power consumed (which may assume a particular ambient temperature) by a corresponding one of the interface groups even when no transactions are received. At the end of each given time interval, the PICH activity control circuitry 420 may compute a power estimate for each one of the groups of interfaces within the PICH 120 utilizing the stored information in the PICH activity table 410. In one embodiment, for each one of the group of interfaces, the control circuitry 410 utilizes the formula (Transaction Count/Maximum Count)×Weight×Dynamic Power+Static Power. Following this, the control circuitry 420 may sum the computed power estimates and send the result to a power management unit within the APU 110.

Figure 5:
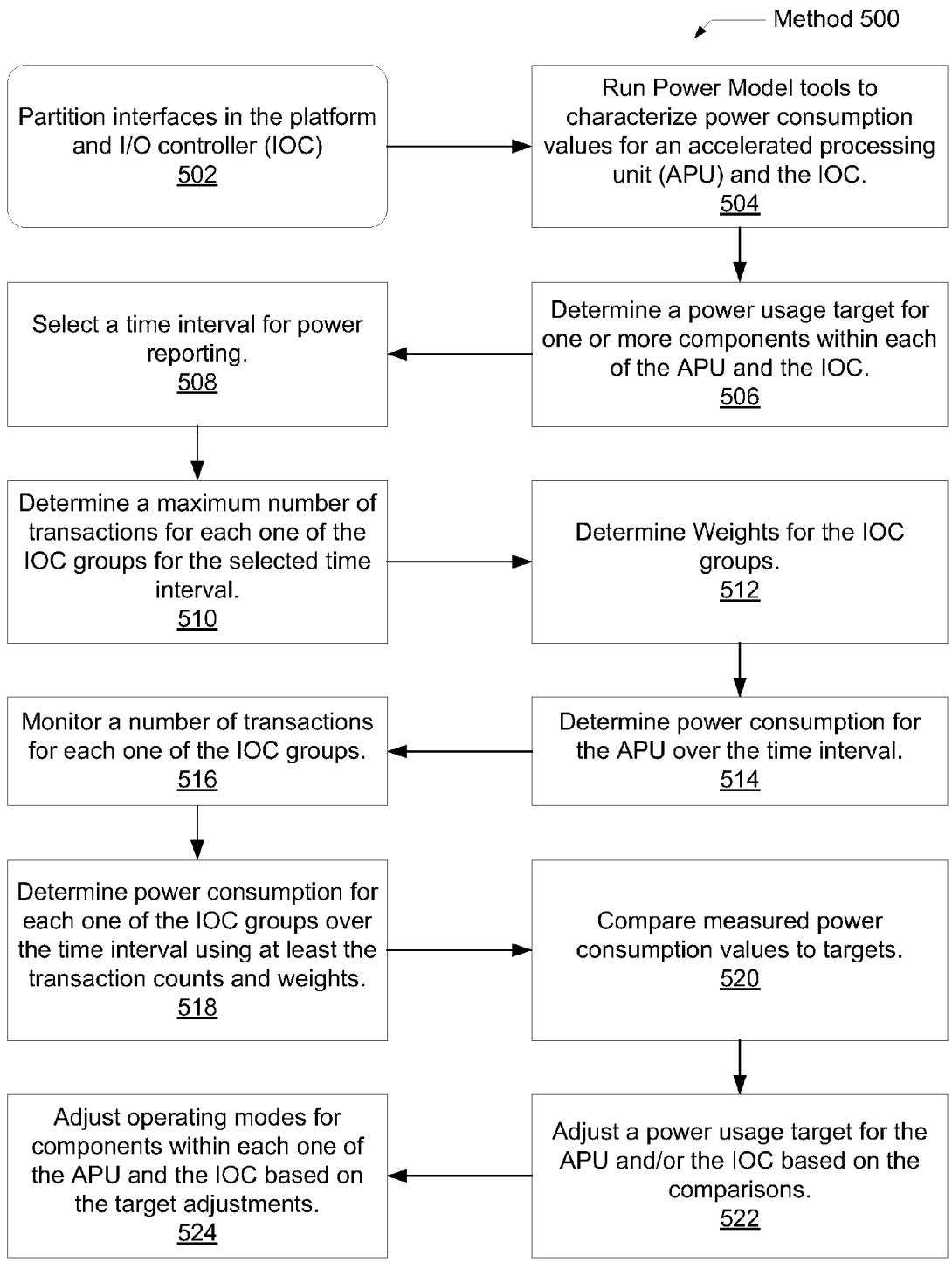
FIG. 5 is a generalized flow diagram of another embodiment of a method for power management including power reporting for a platform and I/O controller hub.

Referring now to FIG. 5, a generalized flow diagram of one embodiment of a method 500 for power management including power reporting for a platform and I/O controller hub is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 502, the interfaces in the platform and I/O controller hub (PICH) 120 may be partitioned into groups. Each group of interfaces may include one or more interfaces related to one another or have a similar effect on power consumption. In block 504, a power model and a broad number of applications may be executed on a die, or a model of a die, such as the system-on-a-chip (SOC) 100, in order to characterize power consumption over the die during sample intervals. Characterized power estimates may be found for the APU 110 and the PICH 120.

In block 506, a power usage target for one or more components within each of the APU 110 and the PICH 120 may be determined. For example, a thermal design point (TDP) may be determined for the SOC 100 and for the components, such as the CPU 130, the GPU 140 and the PICH 120. In block 508, based on the power characterizations, operating parameters may be conveyed to the SOC 100 for use in configuring the components within the SOC 100 to report power consumption. For example, particular time intervals for power reporting may be determined and conveyed to the SOC 100.

In block 510, a maximum number of transactions may be determined for each one of the PICH groups for the selected time interval. At least a corresponding data rate, the time interval and supporting queues (size and number) for data storage may be used to determine the maximum number of transaction. In block 512, a weight value is assigned to each group of interfaces. Each one of the groups of interfaces may have an associated normalized weight corresponding to an internal power consumed when transactions are performed as compared to other groups of interfaces.

In block 514, a power management unit within the APU 110 may determine a power consumption value over the selected time interval for each of its components, such as the CPU 130 and the GPU 140. The sum of the values may provide a power consumption value for the entire APU 110. In block 516, a number of executed transactions for each one of the PICH groups may be monitored and accumulated. In block 518, a power consumption value for each one of the PICH groups over the selected time interval may be determined using at least the transaction counts and weights. The formulas described earlier may be used, such as (Transaction Count/Maximum Count)×Weight×Dynamic Power+Static Power. Total power consumption for the PICH 120 may be found by summing the individual power estimates. This total value may be sent to a power management unit within the APU 110.

In block 520, the measured power consumption values for each of the CPU 130, the GPU 140 and the PICH 120 may be compared to target values. In block 522, a power usage target for the CPU 130, the GPU 140 and the PICH 120 may be adjusted based on the comparisons. Each one of the units may have a corresponding power target, such as a TDP value, increased or decreased. The adjustments, however, maintain a total TDP value below the target TDP value for the SOC 100. In block 524, operating modes for the components within each one of the APU 110 and the PICH 120 may be adjusted based on the target adjustments.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
   one or more processing units, each assigned a respective power limit that is a portion of a chip power limit for the semiconductor chip;
   an input/output (I/O) controller (IOC) comprising a plurality of interfaces, wherein the IOC is assigned an I/O power limit that is a portion of the chip power limit; and
   a power manager;
   wherein the IOC is configured to determine a power estimate for the IOC based at least in part on monitored activity levels of the interfaces; and
   wherein in response to detecting a difference between the power estimate and an assigned I/O power limit, the power manager is configured to adjust a power limit of at least one of the processing units based on said difference;
   wherein the IOC is further configured to determine the power estimate based on a ratio of a number of either or both input/output (I/O) and direct memory access (DMA) transactions on a given interface to a maximum number of I/O and DMA transactions supported by the given interface during a given time interval.

2. The semiconductor chip as recited in claim 1, wherein the activity levels correspond to a respective number of either or both I/O and DMA transactions executed by a corresponding one of the plurality of interfaces.

3. The semiconductor chip as recited in claim 1, wherein the activity levels correspond to a respective measured current drawn during either or both I/O and DMA transactions executed by a corresponding one of the plurality of interfaces.

4. The semiconductor chip as recited in claim 2, wherein the IOC is further configured to manage I/O operations for the one or more processing units based on one or more of the following protocols: Universal Serial Bus (USB), Peripheral Component Interconnect Express (PCIe), Serial Advanced Technology Attachment (SATA), multi-channel high definition audio codec, and system basic input/output software (BIOS) stored in a read only memory (ROM).

5. The semiconductor chip as recited in claim 1, wherein said time interval is configurable.

6. The semiconductor chip as recited in claim 2, wherein the IOC is further configured to determine the power estimate based on a product of said ratio and a normalized weight for each one of the plurality of interfaces, wherein the normalized weight corresponds to an internal power consumed by the IOC when the number of either or both I/O and DMA transactions are performed.

7. The semiconductor chip as recited in claim 6, wherein the IOC is further configured to determine the power estimate based on creating at least one group of two or more interfaces with a corresponding normalized weight and a maximum number of either or both I/O and DMA transactions for a given time interval.

8. The semiconductor chip as recited in claim 7, wherein the maximum number of either or both I/O and DMA transactions for the at least one group of two or more interfaces is based on a respective maximum supported data rate.

9. A method comprising:
   monitoring an activity level for each one of a plurality of interfaces within a input/output (I/O) controller (IOC) on a same die as one or more processing units, each processing unit being assigned a power limit that is a portion of a power limit for the die; and
   determining a power estimate for the IOC based at least in part on the activity levels and a ratio of a number of either or both input/output (I/O) and direct memory access (DMA) transactions on a given interface to a maximum number of either or both I/O and DMA transactions supported by the given interface during a given time interval;
   wherein in response to detecting a difference between the power estimate and an assigned I/O power limit that is a portion of the die power limit, adjusting a power limit of at least one of the processing units based on said difference.

10. The method as recited in claim 9, wherein the activity levels correspond to a respective number of either or both I/O and DMA transactions executed by a corresponding one of the plurality of interfaces.

11. The method as recited in claim 9, wherein the activity levels correspond to a respective measured current drawn during either or both I/O and DMA transactions executed by a corresponding one of the plurality of interfaces.

12. The method as recited in claim 10, further comprising managing I/O operations within the IOC for the one or more processing units based on one or more of the following protocols: Universal Serial Bus (USB), Peripheral Component Interconnect Express (PCIe), Serial Advanced Technology Attachment (SATA), multi-channel high definition audio codec, and system basic input/output software (BIOS) stored in a read only memory (ROM).

13. The method as recited in claim 9, wherein said time interval is configurable.

14. The method as recited in claim 10, further comprising determining the power estimate based on a product of said ratio and a normalized weight for each one of the plurality of interfaces, wherein the normalized weight corresponds to an internal power consumed by the IOC when a number of either or both I/O and DMA transactions are performed.

15. The method as recited in claim 14, further comprising determining the power estimate based on creating at least one group of two or more interfaces with a corresponding normalized weight and a maximum number of I/O and DMA transactions for a given time interval.

16. The method as recited in claim 14, wherein each one of the one or more processing units is at least one of the following: a general-purpose central processing unit (CPU), a graphics processing unit (GPU), an application specific integrated circuit (ASIC) and a field programmable gate array (FPGA).

17. An on-die power management system comprising:
a power manager coupled to one or more processing units, each assigned a respective power limit that is a portion of a die power limit;
a power reporting unit within a input/output (I/O) controller (IOC) on a same die as the one or more processing units, wherein the power reporting unit is configured to:
monitor an activity level for each one of a plurality of interfaces within the IOC, each assigned a respective power limit that is a portion of a die power limit;
determine a power estimate for the IOC based on at least the activity levels; and
send the power estimate to the power manager;
wherein in response to detecting a difference between the power estimate and an assigned I/O power limit that is a portion of the die power limit, the power manager is configured to adjust a power limit of at least one of the processing units based on said difference;
wherein the IOC is configured to determine the power estimate based on a ratio of a number of either or both input/output (I/O) and direct memory access (DMA) transactions on a given interface to a maximum number of I/O and DMA transactions supported by the given interface during a given time interval.

18. The power management system as recited in claim 17, wherein the activity levels correspond to a respective number of either or both I/O and DMA transactions executed by a corresponding one of the plurality of interfaces.

19. The power management system as recited in claim 17, wherein the activity levels correspond to a respective measured current drawn during either or both I/O and DMA transactions executed by a corresponding one of the plurality of interfaces.

20. The power management system as recited in claim 18, wherein the IOC is further configured to manage I/O operations for the one or more processing units based on one or more of the following protocols: Universal Serial Bus (USB), Peripheral Component Interconnect Express (PCIe), Serial Advanced Technology Attachment (SATA), multi-channel high definition audio codec, and system basic input/output software (BIOS) stored in a read only memory (ROM).

* * * * *